Figure 1:
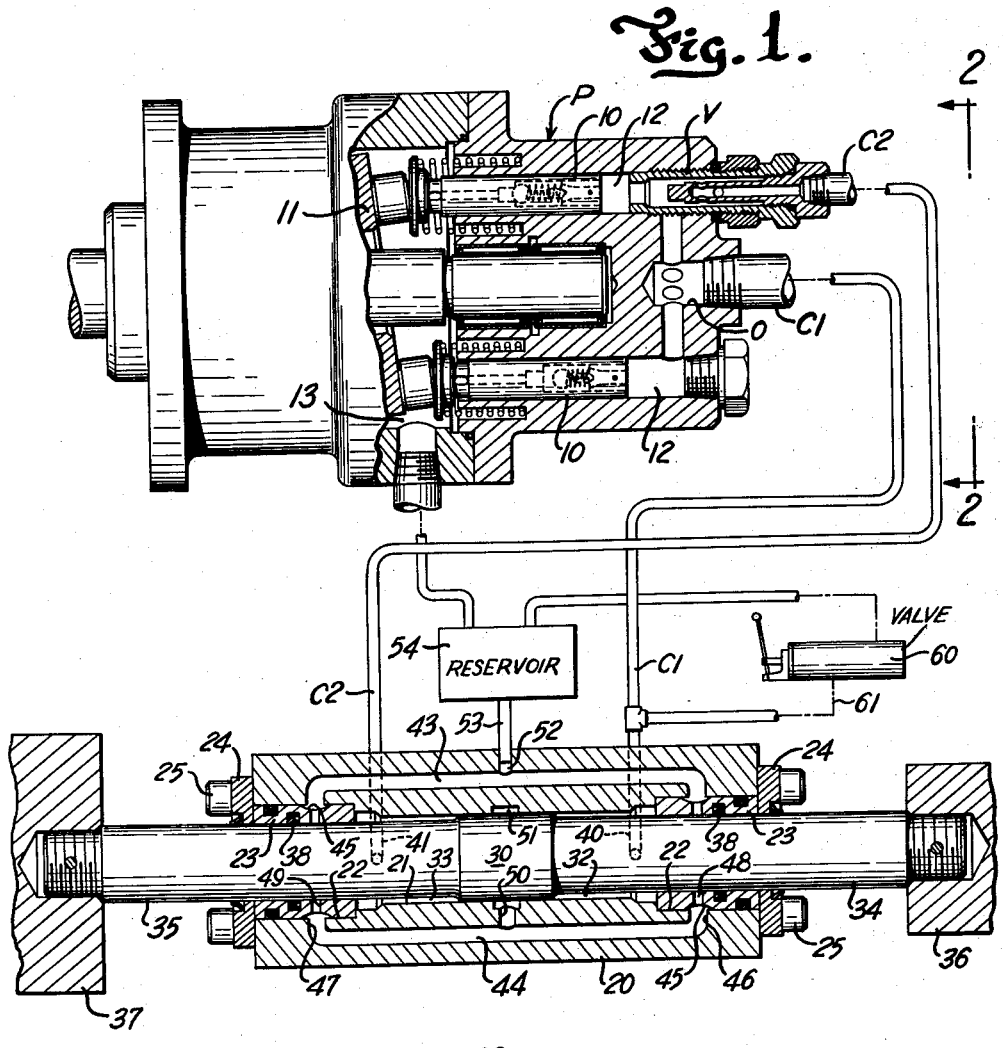

Dec. 31, 1963     H. T. McGEE     3,115,751
HYDRAULIC RECIPROCATORY DEVICE
Filed July 11, 1960

INVENTOR.
Hugh T. McGee
BY
Lieber, Lieber & Nilles
Attorneys

United States Patent Office 3,115,751
Patented Dec. 31, 1963

3,115,751
HYDRAULIC RECIPROCATORY DEVICE
Hugh T. McGee, Milwaukee, Wis., assignor, by mesne assignments, to Applied Power Industries, Inc., a corporation of Wisconsin
Filed July 11, 1960, Ser. No. 41,935
4 Claims. (Cl. 60—52)

The present invention relates to a reciprocatory, hydraulic device of the type which is capable of delivering high impact forces at high frequencies.

According to the present invention, an improved reciprocatory, hydraulic device has been provided in which the opposite sides of a reciprocable member are in direct fluid communication with two separate but synchronized and positive sources of fluid, for example, with opposite sides of a positive displacement, hydraulic pump. The arrangement is such that the reciprocatory member comprises a piston reciprocable in a cylinder and a rod which extends from opposite sides of the piston and outwardly from the cylinder ends. Thus, a chamber is formed on opposite sides of the piston, which chambers are alternately and directly pumping fluid to and receiving fluid from opposite sides of the hydraulic pump.

The invention will be shown and described as being applied to a vibrator, but it should be understood that the invention is not limited to any particular type of function.

The invention finds particular utility when used with a multi-pumping unit hydraulic pump, in which a certain number of pumping units are connected directly, for example, to one side of a vibrator piston and a certain number of pumping units are connected directly to the other side of the piston. Thus, solid columns of fluids are located between opposite sides of the pump and the corresponding sides of the reciprocable piston. In effect, a closed circuit of fluid is provided between the pump and vibrator, and the reciprocatory piston of the vibrator is timed and locked in phase with the pumping and suction strokes of the pump.

A more specific aspect of the invention provides a device of the above type which has control means to vary the stroke of the device selectively in either direction.

In high speed and high fluid pressure work where the present invention has found considerable utility, the bearings which support and seal the reciprocating piston rods in their respective cylinder ends, have been a source of trouble because of wear and leakage, and another aspect of the invention provides that these bearings are deliberately permitted to leak. This controlled leakage acts to lubricate these bearings, and the continually leaking fluid is directed ultimately back to the reservoir, and additional wiper seals prevent leakage past the support bearings to the exterior of the device.

Furthermore, in high speed and high pressure devices of this type, heating of the pressure fluid is also a serious problem, and the present invention provides means for by-passing fluid alternately from either side of the vibrator and replenishing variable amounts of the fluid in the closed circuit to thereby prevent overheating of the fluid. This by-pass means also functions to automatically re-center the piston and prevent its drifting to one side or the other.

Generally, this invention provides an easily and remotely controlled hydraulic device, the impact and/or frequency of which can be readily varied. In addition, the amount of force generated as well as the frequency thereof is considerably more than in devices heretofore known.

Figure 2:
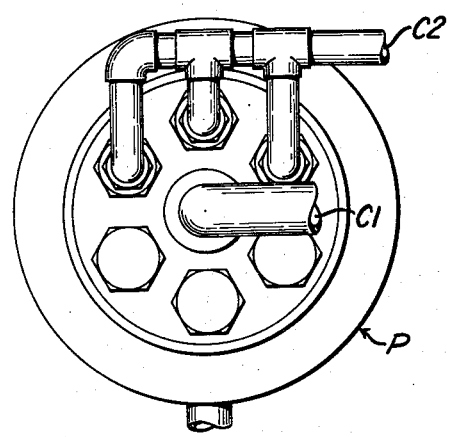

These and other objects and advantages will appear as this disclosure progresses, reference being had to the accompanying drawings:

FIGURE 1 is a more or less schematic diagram of a vibrator circuit embodying the present invention; and FIGURE 2 is an end view of the pump taken from the line 2—2 of FIGURE 1.

Referring in greater detail to the drawings, the particular hydraulic pump P which has been shown for illustrative purposes only may be of the type shown in United States Patent No. 2,941,475 to David T. Blair, issued on June 21, 1960. It is believed sufficient to say for purposes of this disclosure, however, that the output from this pump may be divided. For example, if the pump has six pumping units such as pistons 10, then the flow from three of these consecutive units may be taken from the pump and through a conduit C1, and the flow from the other three consecutive units may be taken through conduit C2. It will be noted, however, that outlet check valves for the pumping units are not used, and the solid column of fluid can move back and forth through the conduits and into and out of the pumping chambers of the pump. Thus, when the pistons are on the suction side of the pump, fluid is sucked into those pumping chambers, and when the pistons are being forced through their pumping stroke the pressure fluid is forced from those pumping units. The shifting of the two columns of fluid, which are contained in essentially a closed circuit, will become more apparent as this disclosure progresses. The flow from the multi-cylinder pumping unit may be divided other than into equal parts, or two separate pumps may be used with a single vibrator.

The pump shown has the rotatably driven wobble plate 11 which causes the pistons to reciprocate in suction and pumping strokes in the well known manner to draw fluid into the pumping chambers 12 from the inlet chamber 13 and through the pistons, and then force the fluid out through that conduit with which they are in communication. In the illustration shown, and as fully described in said patent, three of the pumping units have isolating valves V which direct the fluid separately from the housing. The fluid then is combined in conduit C2. The discharge from the three remaining pumping pistons is delivered to conduit C1 via the common outlet O.

The invention will be shown and described in connection with a multi-piston, axial type pump, but other types of multi-pumping unit pumps may be utilized, as well as any number of pumping pistons or other pumping units. Separate pumps may also be used, it only being necessary that two separate flows are directed to the reciprocable vibrator and that these two sources are synchronized or phased relative to one another, as in the closed system to be described.

The vibrator proper comprises an elongated housing 20 of rectangular cross section and which has a bore 21 extending axially therethrough. At each end of bore 21 is a counterbore 22 in each of which is secured a bearing 23. These bearings are preferably of bronze or other suitable bearing material and are held captive in their counterbores by the retaining caps 24, which caps in turn are held in place on their respective housing end by cap screws 25.

A piston 30 is reciprocatingly mounted in the bore 21 and forms a slidingly sealing fit therewith to thus form, with the bore or cylinder 21, pressurizable and expandable chambers 32 and 33 on opposite sides of the piston. The piston has rods 34, 35 extending from opposite sides thereof which may be formed integrally therewith. The ends of these rods extend outwardly past the ends of the cylinder housing 20, and have threadably secured at their ends the weight members 36, 37, respectively. These members may be removed and replaced with ones of different weights to vary the impact force delivered by the vibrator.

The rods 34, 35 are slidably mounted in the bearings 23, and these bearings act to support the high speed reciprocatory movement of the piston and rods. While these bearings do provide some degree of fluid seal for the chambers 32 and 33, it is not sufficient in itself to prevent leakage through the ends of the housing and at the same time permit the required high speed movement of the piston rods. In other words, these bearings and the piston rods create a passage of pressure drop but do not entirely seal against fluid leakage. The leakage that is allowed past the inner ends of the bearings acts to lubricate the latter and is ultimately disposed of as will appear. Additional seal means are provided between rods 32, 33 and their bearings 23 and are located at the outer end of the bearings. This seal means takes the form of a neoprene cup seal 38, although other forms of shaft seals may be used. Thus, the wiper seals 38 act in series with the bearings 23 to prevent leakage to the exterior of the housing.

The pump P is placed in fluid communication with chambers 32 and 33 via conduits C1 and C2 and their respective passages 40 and 41 in the housing.

As above indicated, means are provided for disposing of the fluid which lubricates the bearings 23. Means are also provided for by-passing a certain percentage of the fluid pumped to the vibrator and returning it to the reservoir. This by-passed fluid is replenished by the suction strokes of the pump pistons, as it is required. In this manner, the fluid is prevented from becoming overheated.

The means for disposing of the bearing lubricating fluid and the means for by-passing a portion of the fluid pumped to the vibrator is as follows.

Axial passages 43 and 44 are drilled in the housing and cross bores 46, 47 are drilled to intersect the ends of these axial passages. Smaller cross bores 48, 49 are drilled through bearings 23 and in alignment with bores 46, 47, respectively. An annular groove 45 is formed around the periphery of the bearings 23 at the juncture of bores 46 and 48 and also 47 and 49. A central cross bore 50 places the center portion of axial passage 44 in communication with the annular groove 51 around the center portion of the cylinder 21. A discharge port 52 places passage 43 in fluid communication via conduit 53 with the fluid reservoir 54.

With the above construction, pressure fluid is admitted to bore 50 when the piston 30 has moved sufficiently far in either direction. This fluid passes through the axial passage 44 to the cross bores 46 and 47, and then enters the annular grooves 45 in bearings 23. In addition, the fluid that has leaked from the chambers 32 and 33 past the inner ends of the bearings 23 to lubricate the latter, then goes through cross bores 48 and 49 and also enters the annular grooves 45. The combined flow of by-passed fluid and lubricating fluid then enters axial passage 43 and is returned to the reservoir via conduit 53.

The annular groove 51 and its associated passages to the reservoir also function to automatically re-center or maintain the piston centered in the cylinder. This is accomplished by the fact that as the piston moves far enough to expose groove 51 to the pressurized chamber, the pressure in that chamber is immediately dumped to the reservoir, thus stopping further movement of the piston. Thus drifting of the piston too far to one side or the other in the cylinder is prevented.

Means are also provided for varying the length of stroke of the vibrator in either direction. This means may take the form of a valve 60 which may be manually or automatically operated, for example, in response to a drop in engine or ground speed of the vehicle on which it is used. This valve may be of the on-off type which can assume either an open or closed position. By opening the valve the action of the vibrator may be stopped but the pump can continue to function and this is important if the pump is being used for other purposes. On the other hand, this valve may, if desired, be of the needle type so that it can function as above indicated to stop the vibrator but not the pump. The needle type valve also provides a second function, namely, to bleed off or bypass only a certain amount of pressure fluid that is being delivered by the pump to the vibrator. Thus, by bleeding off only a portion of the flow, the amount of fluid delivered to the chamber of the vibrator is reduced and the length of travel of the piston is correspondingly reduced.

The valve 60 can be located in either of the conduits C1 or C2, depending on the direction in which it is desired to reduce or vary the stroke. As shown, this valve 60 is connected in conduit C1 by means of the conduit 61 and by reducing the amount of fluid delivered to the chamber 32, it reduces the length of travel of the piston to the left as viewed in FIGURE 1.

The piston rods 34 and 35 may be of different diameters from one another and/or the sizes of the pumping pistons may be different from one another, to thereby vary the speed of the vibrator in one direction or the other. That is to say, the speed of the vibrator in one direction may be different from its speed in the other direction.

With the vibrator provided by the present invention, it is possible to easily control the vibrator from a remote position. Experience has indicated that conduits C1 and C2 of considerable length are feasible, and the long columns of fluid in these conduits create no inertia problems when moved in opposite directions at high speeds, because the weight of this fluid is small compared to the pounds of impact delivered by the vibrator.

The vibrator provided by the present invention is of course capable for use at low frequencies, but as previously indicated, it is particularly adaptable to high frequency work where special problems have heretofore been present.

The speed of the present vibrator is synchronized and locked with the speed of the pump through the solid columns of fluid in this closed circuit system. A vibrator capable of delivering particularly high impact forces at high frequencies has been provided and one in which fluid leakage and heating problems have been overcome. The vibrator is flexible as to installation positions and is easily and accurately adjustable as to its output.

Various modes of carrying out the invention are contemplated as being within the scope of the following claims particularly pointing out and distinctly claiming the subject matter which is regarded as the invention.

What is claimed and desired to be secured by Letters Patent is:

1. A hydraulic device comprising a housing having a bore therethrough which defines a cylinder and having an annular groove centrally disposed along the length thereof, a piston reciprocal in said cylinder and having a neutral position overlying said groove, a pair of rods extending from each of the two opposite ends of said piston and extending beyond the respective ends of said housing, a pair of bearings in said housing at the ends of said bore, said rods being slidingly and sealingly mounted for reciprocation in their respective bearings to form expansible chambers on opposite sides of said piston, two sources of fluid each in direct communication with one of said chambers providing a solid column of fluid directly between said sources and chambers, said sources of fluid being synchronized to successively and alternately deliver fluid to, and suck fluid from, said chambers causing reciprocation of said piston to points beyond said groove and alternately communicating one of said chambers with said groove, a reservoir for said sources of fluid, a passageway in said housing for alternately bypassing some of the fluid from one of said chambers to said reservoir through said groove and one of said sources of fluid being adapted to replace said bypassed fluid in said one of said chambers.

2. A hydraulic device comprising a housing having a bore therethrough which defines a cylinder and having an annular groove centrally disposed along the length thereof, a piston reciprocal in said cylinder and having a neutral position overlying said groove, a pair of rods extending from each of the two opposite ends of said piston and extending beyond the respective ends of said housing, a pair of bearings in said housing at the ends of said bore, said rods being slidingly and sealingly mounted for reciprocation in their respective bearings to form expansible chambers on opposite sides of said piston, each of said bearings comprising an outer sealing section, an intermediate section, and an inner section forming a lubricating passage between one of said expansible chambers and said intermediate section, two sources of fluid each in direct communication with one of said chambers providing a solid column of fluid directly between said sources and chambers, said sources of fluid being synchronized to successively and alternately deliver fluid to, and suck fluid from, said chambers causing reciprocation of said piston to points beyond said groove and alternately communicating one of said chambers with said groove, a reservoir for said sources of fluid, a passageway in said housing for alternately bypassing some of the fluid from one of said chambers to said reservoir through said groove and one of said sources of fluid being adapted to replace said bypassed fluid in said one of said chambers.

3. A hydraulic device comprising a housing having a bore therethrough which defines a cylinder and having an annular groove centrally disposed along the length thereof, a piston reciprocal in said cylinder and having a neutral position overlying said groove, a pair of rods extending from each of the two opposite ends of said piston and extending beyond the respective ends of said housing, a pair of bearings in said housing at the ends of said bore, said rods being slidingly and sealingly mounted for reciprocation in their respective bearings to form expansible chambers on opposite sides of said piston, each of said bearings comprising an outer sealing section, an intermediate section, and an inner section forming a lubricating passage between one of said expansible chambers and said intermediate section, two sources of fluid each in direct communication with one of said chambers providing a solid column of fluid directly between said sources and chambers, said sources of fluid being synchronized to successively and alternately deliver fluid to, and suck fluid from, said chambers causing reciprocation of said piston to points beyond said groove and alternately communicating one of said chambers with said groove, a reservoir for said sources of fluid, a passageway in said housing for alternately bypassing some of the fluid from one of said chambers to said reservoir through said groove, one of said sources of fluid being adapted to replace said bypassed fluid in said one of said chambers, and each of said bearings having a cross bore from said passageway to an exposed surface of the rod supported therein.

4. A reciprocatory device of the hydraulic type comprising a housing having a bore therethrough which defines a cylinder, a piston member reciprocable in said cylinder and defining an expansible chamber on either side thereof, a pair of rods extending from each side of said piston beyond the respective ends of said housing, a pair of bearings at each of said housing ends slidably and sealingly supporting said rods, each of said bearings comprising an outer sealing section, an intermediate section and an inner bearing section, said bearing section forming a lubricating passage between the interior of said cylinder and said intermediate section, said housing having formed therein an auxiliary discharge passage, a fluid reservoir in communication with said auxiliary discharge passage, each of said bearings having an independent passageway communicating the interior of said intermediate section and said bearing section to said auxiliary discharge passage, a multi-pumping unit hydraulic pump having the output from its pumping units split into two separate conduits, one conduit being in direct fluid communication with one of said chambers and the other conduit being in direct fluid communication with the other chamber whereby a solid column of fluid is established between the units and their respective chamber, said pump having an inlet in communication with said reservoir, and common means in said pump for causing pumping and suction strokes of all of said units, whereby reciprocation of said member is phased directly with the discharge and suction of the pump.

References Cited in the file of this patent

UNITED STATES PATENTS

| 404,472 | Dunn | June 4, 1889 |
| 1,523,605 | Mueller | Jan. 20, 1925 |
| 2,026,479 | Logan | Dec. 31, 1935 |
| 2,383,180 | Ellinwood | Aug. 21, 1945 |
| 2,676,462 | Berry | Apr. 27, 1954 |
| 2,702,025 | Bacchi | Feb. 15, 1955 |
| 2,941,475 | Blair | June 21, 1960 |

FOREIGN PATENTS

| 475,693 | Great Britain | Nov. 24, 1937 |
| 538,526 | Great Britain | Aug. 7, 1941 |
| 540,183 | Great Britain | Oct. 8, 1941 |
| 149,617 | Sweden | Apr. 12, 1955 |
| 189,199 | Switzerland | Apr. 5, 1935 |